US011853231B2

(12) United States Patent
Christidis

(10) Patent No.: US 11,853,231 B2
(45) Date of Patent: Dec. 26, 2023

(54) TRANSMISSION OF ADDRESS TRANSLATION TYPE PACKETS

(71) Applicant: ATI Technologies ULC, Markham (CA)

(72) Inventor: Kostantinos Danny Christidis, Toronto (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/357,838

(22) Filed: Jun. 24, 2021

(65) Prior Publication Data

US 2022/0417206 A1  Dec. 29, 2022

(51) Int. Cl.
*G06F 12/14* (2006.01)
*H04L 49/90* (2022.01)
(Continued)

(52) U.S. Cl.
CPC .......... *G06F 12/1458* (2013.01); *H04L 41/08* (2013.01); *H04L 49/90* (2013.01); *H04L 61/25* (2013.01)

(58) Field of Classification Search
CPC ............. G06F 12/1458; G06F 12/1009; G06F 12/0873; G06F 12/1072; G06F 12/1036;
(Continued)

(56) References Cited

U.S. PATENT DOCUMENTS 4,669,043 A  5/1987 Kaplinsky
4,700,291 A  10/1987 Saito
(Continued)

FOREIGN PATENT DOCUMENTS

GB  2210479 A  6/1989

OTHER PUBLICATIONS

Kavaldjiev et al., "Providing QoS Guarantees in a NoC by Virtual Channel Reservation", [Lecture Notes in Computer Science] Reconfigurable Computing: Architectures and Applications, 2006, 12 pages, vol. 3985, https://citeseerx.ist.psu.edu/viewdoc/downloaddoi=10.1.1.96.3073 rep=rep1 type=pdf. [Retrieved Aug. 5, 2022].
(Continued)

*Primary Examiner* — Kyung H Shin
(74) *Attorney, Agent, or Firm* — KOWERT HOOD MUNYON RANKIN AND GOETZEL PC; Rory D. Rankin

(57) ABSTRACT

Apparatuses, systems and methods for routing requests and responses targeting a shared resource. A queue in a communication fabric is located in a path between the requesters and a shared resource. In some embodiments, the shared resource is a shared address translation cache stored in an endpoint. The physical channel between the queue and the shared resource supports multiple virtual channels. The queue assigns at least one entry to each virtual channel of a group of virtual channels where the group includes a virtual channel for each address translation request type from a single requester of the multiple requesters. When the at least one entry for a given requester is de-allocated, the queue allocates this entry only with requests from the assigned virtual channel even if the empty entry is the only available entry of the queue.

20 Claims, 5 Drawing Sheets

(51) Int. Cl.
*H04L 61/25* (2022.01)
*H04L 41/08* (2022.01)

(58) Field of Classification Search
CPC .. G06F 12/1475; H04L 41/08; H04L 12/4641
See application file for complete search history.

(56) References Cited

U.S. PATENT DOCUMENTS

| | | | |
|---|---|---|---|
| 5,060,137 A | 10/1991 | Bryg et al. | |
| 5,491,806 A | 2/1996 | Horstmann et al. | |
| 5,564,052 A | 10/1996 | Nguyen et al. | |
| 5,623,619 A | 4/1997 | Witt | |
| 5,671,444 A | 9/1997 | Akkary et al. | |
| 5,680,572 A | 10/1997 | Akkary et al. | |
| 5,751,996 A | 5/1998 | Glew et al. | |
| 5,752,274 A | 5/1998 | Garibay, Jr. et al. | |
| 5,761,691 A | 6/1998 | Witt | |
| 5,895,501 A | 4/1999 | Smith | |
| 5,924,125 A | 7/1999 | Arya | |
| 5,963,984 A | 10/1999 | Garibay, Jr. et al. | |
| 6,038,661 A | 3/2000 | Yoshioka et al. | |
| 6,079,003 A | 6/2000 | Witt et al. | |
| 6,189,074 B1 | 2/2001 | Pedneau | |
| 6,226,732 B1 | 5/2001 | Pei et al. | |
| 6,233,652 B1 | 5/2001 | Mathews et al. | |
| 6,304,944 B1 | 10/2001 | Pedneau | |
| 6,446,189 B1 | 9/2002 | Zuraski, Jr. et al. | |
| 8,275,598 B2 | 9/2012 | Andreev et al. | |
| 8,751,830 B2 | 6/2014 | Muff et al. | |
| 9,053,049 B2 | 6/2015 | Muff et al. | |
| 10,380,039 B2 | 8/2019 | Cooray et al. | |
| 10,810,133 B1 | 10/2020 | Volpe et al. | |
| 11,243,892 B2 | 2/2022 | Krueger | |
| 2008/0298274 A1* | 12/2008 | Takashige | H04L 41/08 370/254 |
| 2009/0024833 A1 | 1/2009 | Deneroff et al. | |
| 2014/0281366 A1 | 9/2014 | Felch | |
| 2019/0347125 A1 | 11/2019 | Sankaran et al. | |
| 2021/0064539 A1* | 3/2021 | Gonion | G06F 12/1458 |

OTHER PUBLICATIONS

Stevens, Ashley, "Introduction to QoS Virtual Networks (QVN)", White Paper, ARM Limited, Dec. 2013, 5 pages.
International Search Report and Written Opinion in International Application No. PCT/IB2022/056423, dated Nov. 17, 2022, 10 pages.

* cited by examiner

TRANSMISSION OF ADDRESS TRANSLATION TYPE PACKETS

BACKGROUND

Description of the Relevant Art

In computing systems, some types of applications perform functions that are better able to exploit parallel processing and shared memory than other applications. Examples of such applications include machine learning applications, entertainment and real-time applications, as well as some business, scientific, medical and other applications. While some processor architectures include more than one processing unit (e.g., CPU, GPU, multimedia engine, etc.) or processing core, in some cases, one or two additional processing units or cores coupled to a memory does not necessarily provide a sufficient level of parallelism to provide a desired level of performance.

In addition to read and write access commands and corresponding data, coherency probes, interrupts and other communication messages are also transferred in the system through a communication fabric (or fabric). Examples of interconnections in the fabric are bus architectures, crossbar-based architectures, network-on-chip (NoC) communication subsystems, communication channels between dies, silicon interposers used to stack chips side-by-side, through silicon vias (TSVs) used to vertically stack special-purpose dies on top of processor dies, and so on.

In many cases, the fabric has multiple physical channels, each supporting relatively wide packets. While transferring data within a single fabric, the fabric reduces latency as a relatively high number of physical wires are available. However, when connecting separate dies together via the fabric, and when connecting separate processing nodes together, each with a respective fabric, the data is transferred over a significantly lower number of physical wires, which limits available bandwidth. In some cases, the link physical wires transfer data with a data rate that is a multiple of the physical wire data rate on the die. However, there is still a significant bandwidth reduction when communicating between die and between nodes.

In addition to the above inefficiency for transporting data, it is possible for intermediate queues in the communication fabric to become full or prioritize entries for issue based on age. The entries store packets that include requests or corresponding responses. It is possible for high priority packets to wait while lower priority packets are issued by the queue. When one or more queues delay a high priority request on a first path from a requester to a shared resource, and additionally, one or more queues delay a high priority response corresponding to the request on a second path from the shared resource to the requester, performance suffers.

In view of the above, efficient methods and systems for efficiently routing requests and responses targeting a shared resource are desired.

Figure 1:
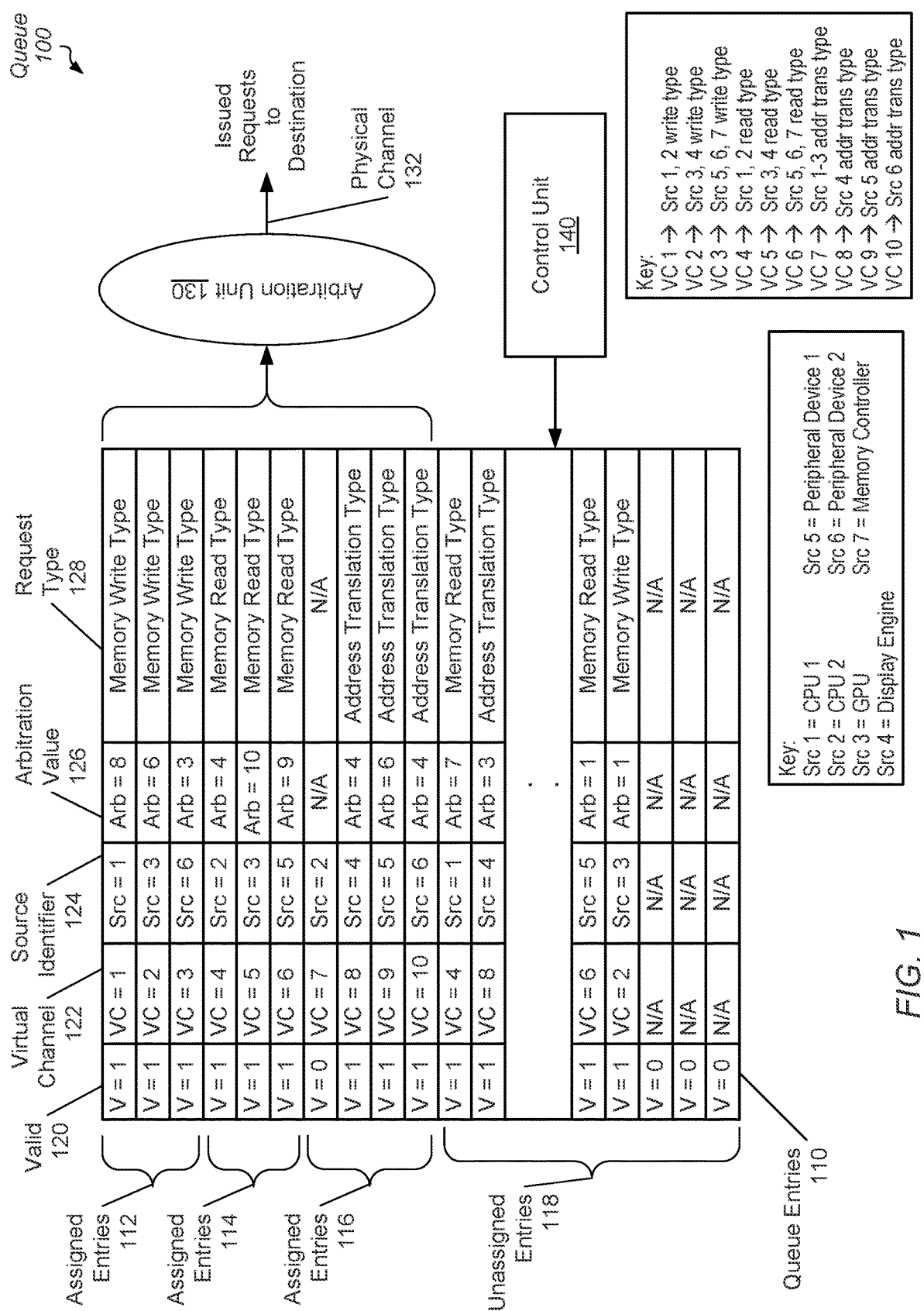
FIG. 1 is a generalized diagram of a queue that stores at least address translation requests.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses, systems and methods for efficiently routing requests and responses targeting a shared resource are contemplated. In various embodiments, a computing system includes a shared resource accessed by multiple requesters through a communication fabric. In various embodiments, the shared resource is a copy of at least a portion of the virtual-to-physical address translations of a page table. In some cases, the destination is a memory controller that stores the shared page table. In other cases, the destination is an I/O peripheral device (or peripheral device) that stores a copy of a portion of the shared page table. A queue in the communication fabric is located in a path between a source that requests access to the shared page table and a destination that includes the shared page table. The queue stores requests in its entries that request services from the destination.

The queue includes a unidirectional channel that transfers data from the queue to the destination. The transferred data includes one or more requests selected for issue by the queue. The unidirectional channel is referred to as a "physical channel," which includes a predetermined number of physical wires between the queue and the destination. Therefore, the physical channel has a limit of the physical resources for supporting it such as transmitter and receiver circuitry and storage elements. Rather than increase throughput for the multiple sources requesting access of the destination by increasing the number of physical channels, the queue supports time division multiplexing over the existing physical channel. The time division multiplexing supported by the queue creates multiple "virtual channels" between the queue and the destination. Therefore, data transfer over the single physical channel is done for multiple virtual channels without increasing physical resources. In some cases, a virtual channel is assigned to a particular source. In other cases, a virtual channel is assigned to a particular request type. In yet other cases, a virtual channel is assigned to a particular request type from a particular source.

Circuitry of the queue between the source and the destination includes an arbitration unit and a control unit. The control unit of the queue maintains assigned entries and unassigned entries of the queue storing requests from the multiple sources. In an embodiment, the control unit assigns at least one entry to each virtual channel of a group of virtual channels where the group includes a virtual channel for each address translation request type from a single source of the multiple sources. One example of the address translation request is a read request requesting to retrieve a copy of one or more virtual-to-physical address translations from the destination. Another example of the address translation request is an invalidation request requesting to invalidate one or more stored virtual-to-physical address translations stored at the destination.

The arbitration unit selects one or more requests from the assigned entries to issue based on selection criteria such as one or more attributes. When at least one or more assigned entries for a given virtual channel are empty, the circuitry allocates these entries with requests of the given virtual channel stored in unassigned entries. However, if the control unit determines that there are no unassigned entries allocated for the given virtual channel, then the control unit maintains the assigned one or more entries as empty. For example, the control unit does not allocate the assigned one or more entries for other virtual channels even if the assigned one or more entries are the only available entries of the queue.

Referring to FIG. 1, a generalized block diagram of one embodiment of a queue 100 that stores at least address translation requests is shown. In the illustrated embodiment, the queue 100 includes queue entries 110 (or entries 110), arbitration unit 130, and control unit 140. In addition, two keys are provided in the bottom right corner. The keys provide mappings describing the device types associated with the sources, and mappings of virtual channels to sources and request types. The entries 110 store a variety of request types from one or more sources being sent to one or more destinations. The entries 110 include both assigned entries 112, 114, and 116 and unassigned entries 118. The arbitration unit 130 includes circuitry that selects one or more requests from the assigned entries 112, 114 and 116 to issue to a destination based on selection criteria such as one or more attributes. The one or more issued requests are sent on physical channel 132 to the destination. The entries of the issued requests are later allocated by requests stored in the unassigned entries 118 based on virtual channel. The control unit 140 includes circuitry that maintains the allocation of entries 110 and determines how many entries to provide to the assigned entries 112, 114, and 116 and unassigned entries 118.

The bottom right corner of FIG. 1 includes two keys. The first key includes a mapping of the sources to device types. For example, "Src 1," or Source 1, is a first central processing unit (CPU) of a computing system. Similarly, "Src 2," or Source 2, is a second central processing unit (CPU) of the computing system, and so on. Although a particular number of devices and types of devices are shown in the first key, in other embodiments, the computing system that uses queue 100 includes another number and type of devices. The second key includes a mapping of a virtual channel (VC) to sources and request types. For example, "VC 1," or virtual channel 1 is assigned to memory write request types from sources 1 and 2, which are CPU 1 and CPU 2. It is noted that although virtual channels are assigned to memory write requests and memory read requests from multiple sources, a single virtual channel is assigned to a combination of a single source and the address translation request type. Therefore, no source shares a virtual channel when the source generates an address translation request type. As shown, each virtual channel has a single assigned entry of assigned entries 112, 114 and 116. In other embodiments, a virtual channel has one or more entries of assigned entries 112, 114 and 116.

Entries 110 are implemented with one of a variety of random access memories (RAMs), a content addressable memory (CAM), multiple registers or flip-flop circuits, or other. In some embodiments, the entries 110 store a variety of transactions from multiple sources targeting a same destination. The queue 100 receives transactions from the multiple sources via a communication fabric. The communication fabric supports the transfer of requests, responses, and other types of messages between sources and destinations. Examples of the sources are a central processing unit (CPU), a multimedia engine that processes one or more of audio and visual data, an application specific integrated circuit (ASIC), a graphics processing unit (GPU), one of a variety of input/output (I/O) peripheral devices, and so forth. The sources are also referred to as requesters and "clients" that are capable of generating requests and messages to be serviced by a destination. Examples of destinations include a memory controller and the examples of the sources when the sources are requested to perform a service by a received request. Destinations are also referred to as an "endpoint," which is a device that services requests received from clients targeting the device.

Examples of transactions stored in entries 110 are memory read requests, memory write requests, memory snoop (probe) requests, token or credit messages, and address translation requests. Other examples of request types are also included in other embodiments. One example of the address translation request is a read request requesting to retrieve a copy of one or more virtual-to-physical address translations from the destination. Another example of the address translation request is an invalidation request requesting to invalidate one or more stored virtual-to-physical address translations stored at the destination. Although the two keys at the bottom right corner provide information for memory write requests, memory read requests and address translation requests, in other embodiments, other types of requests are included in the assignments of the virtual channels.

An operating system assigns a virtual address space to a software process, and the address space is divided into blocks of a particular size. Each block is a "page" of address space. The virtual pages are mapped to frames of physical memory, and mappings of virtual addresses to physical addresses track the stored locations of the virtual pages in the physical memory. These mappings are stored in a page table and external system memory stores this page table. A copy of at least a portion of the page table is stored in an address translation cache of a destination. The address translation cache may also be referred to as a translation look-aside buffer (TLB). Examples of destinations that store this copy of at least a portion of the page table include one or more of a memory controller for system memory and an endpoint such as an I/O peripheral device (or peripheral device).

The queue 100 includes a physical channel 132 that transfers one or more requests selected for issue from the entries 110 to the destination. The transferred data includes one or more requests selected for issue by the queue. The physical channel 132 includes a predetermined number of physical wires between the queue 100 and the destination. Therefore, the physical channel 132 has a limit of the physical resources for supporting it such as transmitter and receiver circuitry and storage elements. Rather than increase the number of physical channels 132 to improve throughput, the control unit 140 supports time division multiplexing over the existing physical channel 132. The time division multiplexing supported by the control unit 140 creates multiple "virtual channels" between the queue 100 and the destination.

In some cases, the control unit 140 assigns a virtual channel to a particular source. In other cases, the control unit 140 assigns a virtual channel to a particular request type. For example, the control unit maintains assigned entries 112 for memory write requests. Additionally, the control unit maintains assigned entries 114 for memory read requests. Further, the control unit maintains assigned entries 116 for address translation requests. Although three sets of assigned entries are shown, each with a particular number of entries, another number of sets of assigned entries is possible and contemplated. It is also possible for each set of assigned entries to have another number of entries than the number shown.

Although assigned entries 116 are assigned to address translation types, it is noted that in the illustrated embodiment, a single entry is assigned to a particular virtual channel. Here, a virtual channel is assigned to an address translation request from a particular source. In one example, virtual channel (VC) 8 is assigned to address translation requests from a display engine, VC 9 is assigned to address translation requests from a first type of peripheral device, and VC 10 is assigned to address translation requests from a second type of peripheral device, and so forth. Although virtual channel identifiers 7-10 are used here, in other embodiments, other identifiers are used. Therefore, the control unit 140 assigns at least one entry to each virtual channel of a group of virtual channels where the group includes a virtual channel for each address translation request type from a single source of the multiple sources. In contrast, VC 1 is assigned to memory write requests from two or more sources such as a CPU 1 and a CPU 2.

As shown, the entries 110 include multiple fields 120-128 for storing information corresponding to received requests. Although a particular number and type of fields are shown in entries 110, in other embodiments, another number of fields and other types of fields are stored in entries 110. As shown, the entries 110 store metadata such as a status field 120, which stores at least a valid (V) bit that indicates whether a corresponding entry is allocated with a request. The field 122 stores a virtual channel (VC) identifier (ID). Virtual channel IDs are assigned dynamically during runtime of applications. During the assignment stage, an individual virtual channel ID is assigned to address translation request types from a single source of the multiple sources. Field 124 stores a source or client identifier (ID) that is shown as "Src." The source ID identifies the source that generated and sent the request.

The entries 110 also include the field 126 that stores an arbitration value indicated by "Arb." The arbitration value is based on selection criteria such as one or more attributes. Examples of these attributes are a received priority level of the request, a quality-of-service (QoS) parameter, a source identifier (ID), an application ID or type, such as a real-time application, a virtual channel ID, a bandwidth requirement or a latency tolerance requirement, an indication of age, and so forth. In some embodiments, these values are stored in individual fields of entries 110, and arbitration unit 130 receives one or more of these values and determines a final attribute value of entries among the assigned entries 112, 114 and 116. In other embodiments, the control unit 140 receives one or more of these values and determines a final attribute value to store in entries 110. The control unit 140 updates these arbitration values based at least upon age.

The field 128 of the entries 110 includes the request type such as a memory write request, a memory read request and an address translation request. Examples of other types of information stored in other fields (not shown) of queue entries 110 are a target address corresponding to the request, and an indication of a data size to read or write, an indication of an age of a corresponding request, a destination ID, an ID of a previous hop within the communication fabric prior to the queue 100 receiving the corresponding request, a software process ID, an application ID, an indication of data type, such as real-time data or non-real-time data, and so forth.

Based at least upon a final value determined from selection criteria, the arbitration unit 130 selects one or more requests from the assigned entries 112, 114 and 116 to issue to the destination via the physical channel 132. In some embodiments, when the arbitration unit 130 selects two or more requests from the assigned entries 112, 114 and 116 to issue, the arbitration unit 130 selects at least one request from the assigned entries 116 during each arbitration stage. Each arbitration stage can be one or more clock cycles or pipeline stages depending on the implementation. In other words, the arbitration unit 130 selects at least one request from the assigned entries 116 each time requests are issued from the queue entries 110. Therefore, the arbitration unit 130 selects for issue at least one address translation request from the group of virtual channels of assigned entries 116 during each arbitration stage although the selected address translation request has a lower arbitration value than one or more requests in the assigned entries 112 and 114. In one example, the arbitration unit 130 selects two requests for issue during each arbitration stage. rather than select the two memory read requests of entries 114 of virtual channels 5 and 6 with arbitration values 10 and 9, the arbitration unit 130 selects the memory read request with VC 5 and arbitration value 10 of entries 114 and the address translation request with VC 9 and arbitration value 6 of entries 116. In such a manner, the arbitration unit 130 ensures address translation requests are sent to the destination as soon as possible.

When one or more entries of assigned entries 116 are empty (V=0), or de-allocated, the control unit 140 allocates these entries with address translation requests from the corresponding virtual channel stored in the unassigned entries 118. The entries of assigned entries 112 and 114 are allocated in a similar manner with requests of the type assigned to the entries. However, if the control unit 140 determines that there no entries of unassigned entries 118 allocated for the corresponding virtual channel, then the control unit 140 maintains the one or more entries of assigned entries 116 as empty. For example, the control unit 140 does not allocate the assigned one or more entries of entries 116 for other virtual channels even if the assigned one or more entries are the only available entries of entries 110. For example, if the entry of entries 116 allocated with an address translation type for VC=1 and Arb=8 is de-allocated due to being selected for issue, and no entry of entries 118 has a request for VC=1, then the entry of entries 116 assigned to VC=1 remains de-allocated despite requests stored in unassigned entries 118 needing an entry in the assigned entries 112, 114 and 116. Another example is the entry for VC=7 of entries 116 that remains de-allocated despite requests stored in unassigned entries 118 needing an entry in the assigned entries 112, 114 and 116 when the unassigned entries 118 have no requests for VC=7.

In some embodiments, the control unit 140 allocates received requests in an in-order contiguous manner beginning at an assigned entry of entries 112, 114 and 116 based on the virtual channel. In such embodiments, the control unit 140 maintains an oldest request corresponding to a particular virtual channel in a corresponding one of the assigned entries 112, 114 and 116. From the perspective of a particular virtual channel, the queue 100 appears to provide first-in-first-out (FIFO) data storage. It is noted that queue 100 is located in a path between a source that requests access to a shared address translation cache and a destination that includes the shared address translation cache. In some embodiments, at least the queue 100 and the destination support an interconnect communication protocol, and this protocol includes a specification for routing address translation requests. In some embodiments, the supported specification is the Address Translation Services (ATS) specification of the PCIe (Peripheral Component Interconnect Express) interconnect communication protocol. The ATS specification supports the remote caching (storing) of address translations on an endpoint. In other embodiments, another specification and another interconnect communication protocol are supported.

It is also noted that another queue similar to queue 100 is used to store responses corresponding to at least address translation requests. The types of responses include a completion acknowledgment indicating whether an address translation read request is granted, an acknowledgment indicating whether an invalidation request is granted, and response data such as one or more copies of requested virtual-to-physical address translations. In various embodiments, this other queue is organized in a similar manner as queue 100 and the responses stored in queue entries are processed in a similar manner.

Figure 2:
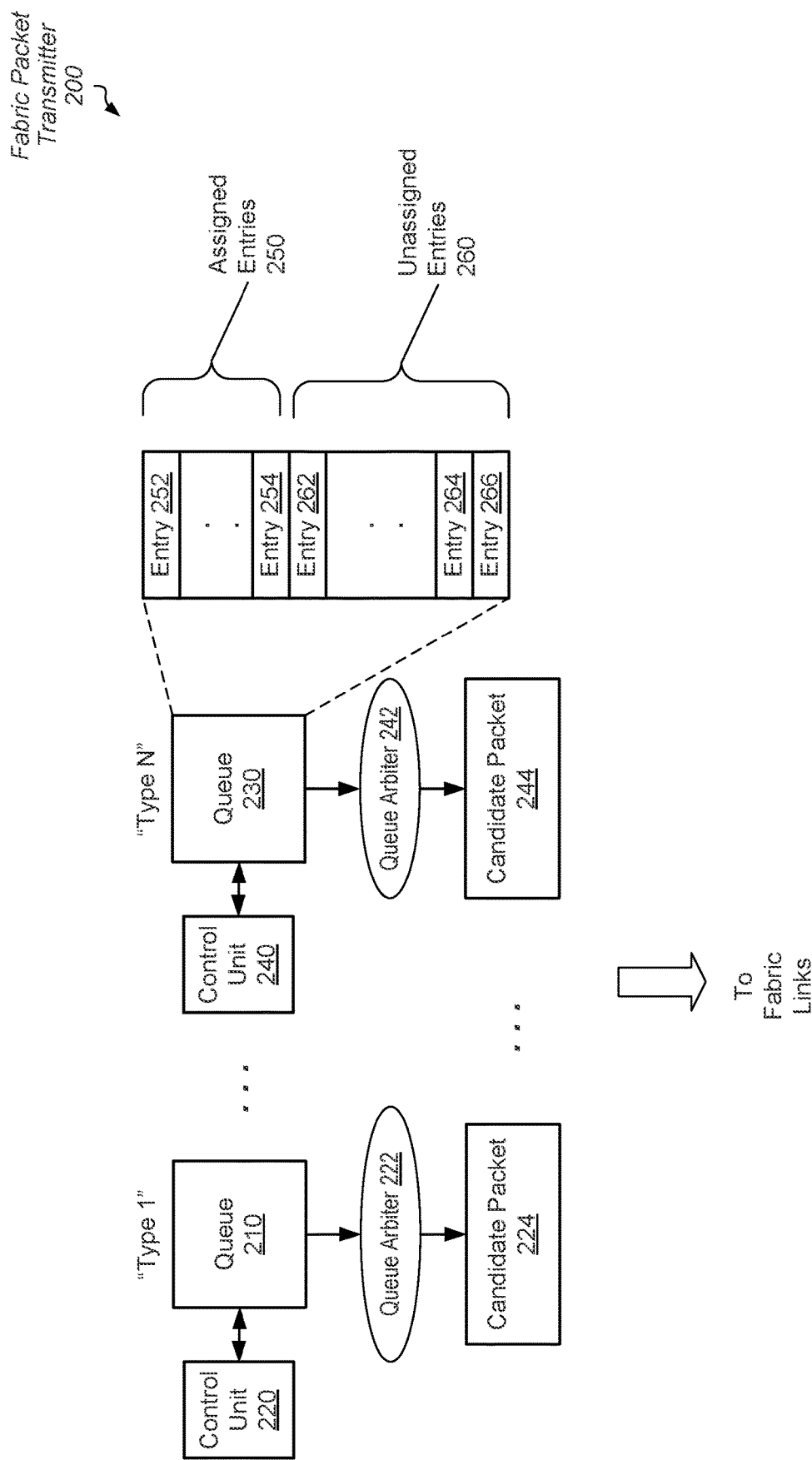
FIG. 2 is a generalized diagram of one embodiment of a packet transmitter that processes at least address translation requests.

Turning to FIG. 2, a generalized block diagram of one embodiment of a fabric packet transmitter 200 is shown. In the illustrated embodiment, the fabric packet transmitter 200 includes queues 210 and 230, each for storing packets of a respective type. In some embodiments, the packet is a flow control unit ("flit"). A flit is a subset of a larger packet. Flits generally carry data and control information, such as header and tail information for the larger packet. Although the data for transmission is described as packets routed in a network, in other embodiments, the data for transmission is a bit stream or a byte stream in a point-to-point interconnection. In various embodiments, queues 210 and 230 store control packets to be sent on a fabric link. Corresponding data packets, such as the larger packets corresponding to flits, are stored in other queues. In other embodiments, queues 210 and 230 store the data packets, and the corresponding control packets are stored in other queues.

When fabric packet transmitter 200 is placed in a data flow from sources generating requests to destinations servicing requests, examples of control packet types stored in queues 210 and 230 are memory read request type, memory write request type, probe (snoop) message type, token or credit type, address translation read access type, and address translation invalidate type. When fabric packet transmitter 200 is placed in a data flow from destinations that service requests to sources waiting for requests to be serviced, examples of control packet types stored in queues 210 and 230 are read response type, write response type, probe (snoop) response type, address translation read access response type, and address translation invalidate response type. Other examples of packet types are also included in other embodiments.

In some embodiments, queue 210 stores packets of "Type 1," which is a control request type. Queue 230 stores packets of "Type N," which is an address translation request type in an embodiment. In other embodiments, "Type 1" and "Type N" correspond to distinct virtual channels, rather than request types. As described earlier, one example of the address translation request is a read request requesting to retrieve a copy of one or more virtual-to-physical address translations from the destination. Another example of the address translation request is an invalidation request requesting to invalidate one or more stored virtual-to-physical address translations stored at the destination. Queues between queues 210 and 230 store packets of "Type 2" to "Type N-1", which include other control response types or other distinct virtual channels depending on the implementation. Therefore, although only two queues are shown in FIG. 2, fabric packet transmitter 200 includes any number of queues. Although queues 210 and 230 are shown as separate queues, in other embodiments, the entries of queues 210 and 230 are maintained in a single queue.

Queues 210 and 230 are implemented with one of a variety of random access memories (RAMs), a content addressable memory (CAM), multiple registers or flip-flop circuits, or other. Control unit 220 uses hardware, such as circuitry, for determining which entries of queue 210 to allocate when fabric packet transmitter 200 receives new packets. Control unit 220 also updates credits or tokens assigned to sources of packets when packets are allocated into queue 210 and issued from queue 210. For example, control unit 220 determines a minimum number of clock cycles (or cycles) between receiving new packets in order to avoid data collision in the entries of queue 210 when the entries become full or within a threshold number of entries of becoming full. Control unit 240 has similar functionality, although the manner for accessing data in queue 230 may be different than for accessing data in queue 210 due to the type of packets stored in queue 230.

In various embodiments, queue 230, control unit 240 and queue arbiter 242 have similar functionality described earlier for queue 110, control unit 130 and arbitration unit 120 (of FIG. 1). However, queue 110 (of FIG. 1) stored requests of virtual channels besides virtual channels assigned to address translation types. Here, queue 230 stores requests of virtual channels assigned only to address translation types. The control unit 240 assigns at least one entry to each virtual channel of a group of virtual channels where the group includes a virtual channel for each address translation request type from a single source of multiple sources. In some embodiments, the fabric packet transmitter 200 is used at intermediate locations within a communication fabric, whereas, the queue 100 (of FIG. 1) is used as a last queue before a destination.

Queue arbiter 222 uses circuitry to select packets stored in entries of queue 210 for sending on fabric links. In some embodiments, the queue arbiter 222 determines the priority levels of packets from the assigned entries based on one or more attributes. As described earlier, these attributes are one or more of a received priority level of the request, a quality-of-service (QoS) parameter, a source identifier (ID), an application ID or type, such as a real-time application, a virtual channel ID, a bandwidth requirement or a latency tolerance requirement, an indication of age, and so forth. One or more candidate packets 224 are sent on the fabric links when the fabric links are available. Similarly, queue arbiter 242 selects one or more candidate packets 244 from queue 230 to send on fabric links. In some embodiments, queue arbiters 222-242 select candidate packets 224-244 from queues 210-230 each clock cycle. In other embodiments, packets are selected after previously selected candidate packets 230-234 have been inserted in a link packet and sent on fabric links.

As described earlier, queue 230 stores packets of "Type N," which is a packet type corresponding to an address translation request or a packet type corresponding to an address translation response (depending on the direction of data flow upstream or downstream in the communication fabric). For example, a requester with permission to access a particular page table generated a TLB miss, and the requester has sent an address translation request to a memory controller or other endpoint that controls access to a copy of at least a portion of the particular page table. In various implementations, the address translation request will initiate a page table walk. In other implementations, the address translation request will access a particular TLB that stores a copy of requested address translations from the particular page table. Queue 230 is an intermediate queue on the path from the requester to the memory controller or other endpoint. Alternatively, the memory controller or other endpoint is sending a corresponding address translation response to the requester and queue 230 is an intermediate queue on the path from the memory controller or other endpoint to the requester. The received packets of "Type N" are stored in one of entries 252-266 of queue 230.

In some embodiments, the address translations are stored in a shared resource such as a memory controller or other endpoint that stores a shared page table. In some embodiments, the address translation requests are requests based on the Address Translation Services (ATS) specification of the PCIe (Peripheral Component Interconnect Express) interconnect communication protocol. The ATS specification supports the remote caching (storing) of address translations on an endpoint. Queue 230 and the supporting circuitry, such as control unit 240 and queue arbiter 242 reduce the latency of servicing address translation requests for requesters accessing the shared page table. For example, control unit 240 maintains entries 252-254 as assigned entries 250, whereas, control unit 240 maintains entries 262-266 as unassigned entries 260. In various embodiments, each requester that has access to the particular page table has at least one assigned entry in assigned entries 250. Each address translation request from a particular requester of the multiple requesters is assigned a particular virtual channel. For a particular virtual channel, when each of the at least one assigned entries of entries 250 is allocated and a received packet corresponds to the particular requester, control unit 240 selects an available entry of unassigned entries 260 for allocation.

Queue arbiter 242 selects one or more packets to issue from the packets stored in the assigned entries 250. In an embodiment, if a packet of the assigned entries 250 exceeds an age threshold, then the queue arbiter 242 selects the packet. Otherwise, the queue arbiter 242 selects packets from the assigned entries 250 to issue based on one or more attributes as described earlier. Additionally, the queue arbiter 242 is able to select packets from the assigned entries 250 based on a least-recently-selected algorithm, a round-robin algorithm, or other. When the assigned entries of entries 250 for a particular requester are empty (deallocated), the control unit 240 allocates these entries of entries 250 with packets from the unassigned entries 260 corresponding to the particular requester. Therefore, in some embodiments, the control unit 240 maintains an oldest packet from a given virtual channel in one of the assigned entries 250. For example, the control unit 240 services packets from a particular virtual channel in an in-order manner.

However, if the control unit 240 determines that there are no unassigned entries of entries 260 allocated for the particular virtual channel, then the control unit 240 maintains the assigned one or more entries of entries 250 as empty for the particular virtual channel. For example, the control unit 240 does not allocate these empty entries of entries 250 with packets from other virtual channel even if these assigned one or more entries are the only available entries of the queue 230. Therefore, at least one entry of entries 250 remains available for the particular virtual channel although currently the particular virtual channel has no allocated entries in queue 230. Consequently, no virtual channel with access to the shared page table has an address translation packet (request or response) that will be blocked at queue 230 due to no available entries of entries 252-266. Rather, each virtual channel is guaranteed to have at least one available entry of assigned entries 250.

Figure 3:
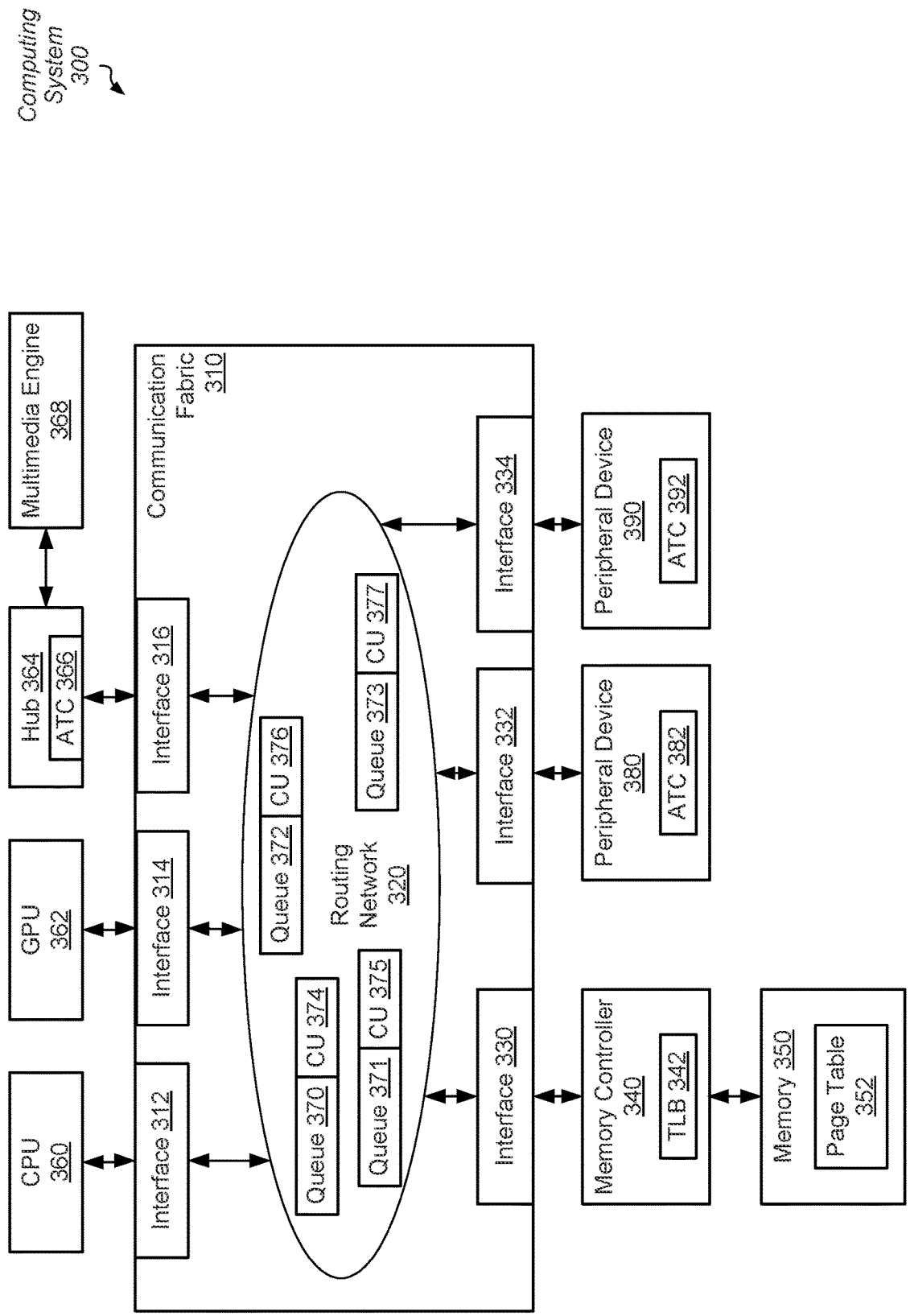
FIG. 3 is a generalized diagram of a computing system that transfers at least address translation requests.

Turning now to FIG. 3, a generalized block diagram of one implementation of a computing system 300 system that transfers at least address translation requests is shown. As shown, the computing system 300 includes communication fabric 310 between each of memory controller 340, peripheral devices 380 and 390, and multiple clients. Memory controller 340 is are used for interfacing with memory 350. Examples of the multiple clients are a central processing unit (CPU) 360, graphics processing unit (GPU) 362, a Hub 364, and peripheral devices 380 and 390. Hub 364 is used for communicating with Multimedia Engine 368. In some implementations, one or more hubs are used for interfacing to a multimedia player (i.e., Hub 364 for Multimedia Engine 368), a display unit, or otherwise. In such cases, the hubs are clients in computing system 300. In some implementations, one or more of the peripheral devices 380 and 390 uses a hub. Each hub additionally includes control circuitry and storage elements for handling data transfer according to various communication protocols. Although five clients 360, 362, 364, 380 and 390 are shown, in other implementations, computing system 300 includes any number of clients and other types of clients, such as display units, one or more other input/output (I/O) peripheral devices, and so forth.

In some implementations, the computing system 300 is a system on a chip (SoC) with each of the depicted components integrated on a single semiconductor die. In other implementations, the components are individual dies in a system-in-package (SiP) or a multi-chip module (MCM). In various implementations, CPU 360, GPU 362, multimedia engine 366, and peripheral devices 380 and 390 are used in a smartphone, a tablet computer, a gaming console, a smartwatch, a desktop computer, a virtual reality headset, or otherwise. The CPU 360, GPU 362, multimedia engine 366, and peripheral devices 380 and 390 are examples of clients capable of generating on-chip network data to transfer. Examples of the network data include memory access requests, memory access response data, memory access acknowledgments, probes and probe responses, address translation requests, address translation responses, address translation invalidate requests, and other network messages between the clients. This network data is placed in network packets (or packets). Each packet includes network data of a particular type. For example, one packet includes one or more requests, another packet includes one or more responses, and so on. The packets include headers with metadata that include multiple identifiers used to identify at least a source, a destination, a virtual channel, a packet type, a data size for response data, a priority level, an application that generated the message, and so on.

To efficiently route packets, in various implementations, communication fabric 310 uses a routing network 320 that includes network switches. In various implementations, one or more of fabric 310 and routing network 320 include status and control registers for storing control parameters. In some implementations, fabric 310 includes hardware, such as circuitry, for supporting communication, data transmission, and network protocols for routing packets over one or more buses. Fabric 310 includes circuitry for supporting address formats, interface signals and synchronous/asynchronous clock domain usage. In some implementations, the network switches of fabric 310 are network on chip (NoC) switches. In an implementation, routing network 320 uses multiple network switches in a point-to-point (P2P) ring topology. In other implementations, routing network 320 uses network switches with programmable routing tables in a mesh topology. In yet other implementations, routing network 320 uses network switches in a combination of topologies. In some implementations, routing network 320 includes one or more buses to reduce the number of wires in computing system 300. For example, one or more of interfaces 330-332 sends read responses and write responses on a single bus within routing network 320.

Each of the CPU 360, GPU 362, multimedia engine 366, and peripheral devices 380 and 390 is capable of being a source and a destination. Sources generate requests for a destination to service. Destinations service the requests and send any responses to the corresponding source. As described earlier, CPU 360, GPU 362, multimedia engine 366, and peripheral devices 380 and 390 are referred to as clients, but these components are also endpoints. As described earlier, an endpoint is a device that acts as a destination that services requests targeting the device.

In various embodiments, one or more of fabric 310, routing network 320, interfaces 312, 314, 316, 330, 332 and 334, and memory controller 340 use intermediate queues, such as queues 370-373, for storing packets being transferred between a source and a destination. Although only routing network 320 is shown to use queues 370-373, it is possible and contemplated that the other components also include similar queues. The queues 370-373 have accompanying control units (CUs) 374-377 with hardware, such as control circuitry and storage elements, that perform multiple functions. Examples of these functions are controlling the access of queue entries, the issuing of packets from the queue entries, and any reordering of storage of the packets within the queue entries. In various embodiments, the queues 370-373 and accompanying control units 374-377 provide the functionality of queue 100 (of FIG. 1). In other embodiments, one or more of queues 370-373 and accompanying control units 374-377 provide the functionality of fabric packet transmitter 200 (of FIG. 2).

In various implementations, communication fabric 310 (or fabric 310) transfers packets between CPU 360, GPU 362, multimedia engine 366, and peripheral devices 380 and 390. Fabric 310 also transfers data between memory 350 and clients such as CPU 360, GPU 362, multimedia engine 366, and peripheral devices 380 and 390, and other peripheral devices (not shown). In various implementations, interfaces 312-316 and 330-334 and memory controller 340 include hardware circuitry for implementing algorithms to provide functionality. Interfaces 312-316 and 332-334 are used for transferring data, requests and acknowledgment responses between routing network 320 and CPU 360, GPU 362, multimedia engine 366, and peripheral devices 380 and 390. One or more of interfaces 312-316 and 332-334 and control units 374-377 include circuitry for generating packets, decoding packets, and supporting communication with routing network 320. In some embodiments, the interfaces 312-316 and 330-334 use a communication protocol such as the PCIe (Peripheral Component Interconnect Express) interconnect communication protocol. In other embodiments, another communication protocol is used. In some implementations, each of interfaces 312-316 and 332-334 communicates with a single client as shown. In other implementations, one or more of interfaces 312-316 and 332-334 communicates with multiple clients and tracks data with a client using an identifier that identifies the client.

Although a single memory controller 340 is shown for memory 350, in other implementations computing system 300 includes multiple memory controllers with each supporting one or more memory channels. Memory controller 340 includes circuitry for grouping requests to be sent to memory 350 and sending the requests to the memory 350 based on timing specifications of the memory 350 with support for burst modes. In various implementations, memories 350-390 include any of a variety of random access memories (RAMs). In some implementations, memory 350 stores data and corresponding metadata in synchronous RAMs (SRAMs). In other implementations, memory 350 stores data and corresponding metadata in one of a variety of dynamic RAMs (DRAMs). For example, depending on the implementation, memory 350 stores data in traditional DRAM or in multiple three-dimensional (3D) memory dies stacked on one another. Although not shown, memory controller 340 or another memory controller provides access to non-volatile memory used to store data at a lower level of the memory hierarchy than memory 350. Examples of the non-volatile memory are hard disk drives (HDDs), solid-state drives (SSDs), and so forth.

When processing applications, the clients 360-366 and other peripheral devices (not shown) store frequently accessed data in one or more caches of a cache memory subsystem. The processors of the clients 360-366 and other peripheral devices utilize linear (or "virtual") addresses to identify requested data. Examples of the requested data are user data, final result data, intermediate result data, and instructions. Each of the software processes being executed by the processors has a virtual address space. The virtual address spaces are divided into pages of a particular size. For example, page sizes of 4 kilobytes (4 KB) or 64 kilobytes (64 KB) are possible although other sizes are also contemplated. The virtual pages are mapped to frames of physical memory. Mappings of virtual addresses to physical addresses track where virtual pages are stored in the physical memory such as page table 352 in memory 350. Although a single page table 352 is shown, another number of page tables is stored in memory 350 in other embodiments.

In order to reduce accesses to the memory 350, a cache is used to store a copy of one or more subsets of the page table 352. For example, the memory controller 340 uses the translation look-aside buffer (TLB) 342 to store the copy. Depending on the one or more applications running, one or more endpoints have permission to access these copies of the subsets of the page table 352. As shown, at least hub 364 and peripheral devices 380 and 390 have this permission, and they store a copy of the subsets of the page table 352 in address translation cache (ATC) 366, ATC 382 and ATC 392. A processor or other circuitry accesses the corresponding one of the ATC 366, ATC 382 and ATC 392 with a virtual address of a given memory access request to determine whether the corresponding address translation cache stores an associated physical address of a memory location holding the targeted data.

When a virtual-to-physical mapping is not found, the processor or other circuitry generates an address translation request to send to an owner of the address translations. In some examples, the memory controller 340 is the owner. In other examples, a peripheral device, such as peripheral device 380, is designated by the operating system or the application as the owner. For example, when applications begin and later end, one or more of the operating system and the application perform dynamic reconfiguration of virtual channel assignments and set up permission for particular clients to access particular page tables. If peripheral device 390 determines a miss occurs during an access of ATC 392, the peripheral device 390 generates an address translation request to send to the peripheral device 380 for accessing the ATC 382. This address translation access request and its corresponding response are transmitted within packets through one or more of queues 370-373. Similarly, when a running application completes, and the address translations are no longer needed, the peripheral device 390 generates an address translation invalidate request to send to each of the hub 364 and the peripheral device 390. This address translation invalidate request and its corresponding response are transmitted within packets through one or more of queues 370-373. Based on the implementations of queues 370-373 and accompanying control units 374-377, the latency of servicing address translation requests are reduced.

Methods 400 and 500 described below are used for circuitry of a queue. The queue stores requests in its entries that target a shared resource. Multiple requesters generate the requests to access the shared resource. In some embodiments, the requesters are clients of a computing system, and the queue is located in a path between the requesters and the shared resource. For example, the queue is located within a communication fabric of the computing system. In various embodiments, access of the shared resource by the multiple requesters is based on a specification of an interconnect communication protocol. In some embodiments, the shared resource is a copy of a portion of a shared page table stored in an address translation cache of a memory controller or another endpoint, and the specification is the Address Translation Services (ATS) specification of the PCIe (Peripheral Component Interconnect Express) interconnect communication protocol. The ATS specification supports the remote caching (storing) of address translations on an endpoint. In other embodiments, another communication protocol is supported. As requests traverse from a requester to the shared resource, the requests are stored in the queue. Circuitry of the queue controls data storage in entries of the queue in addition to determining when to issue requests from the queue. The circuitry of the queue assigns at least one entry to each virtual channel of a group of virtual channels where the group includes a virtual channel for each address translation request type from a single source of multiple sources. Any of the apparatuses, packet transmitters, queues and systems described earlier may be used to implement the steps of methods 400-500. A further description of these steps is provided in the below discussion.

Figure 4:
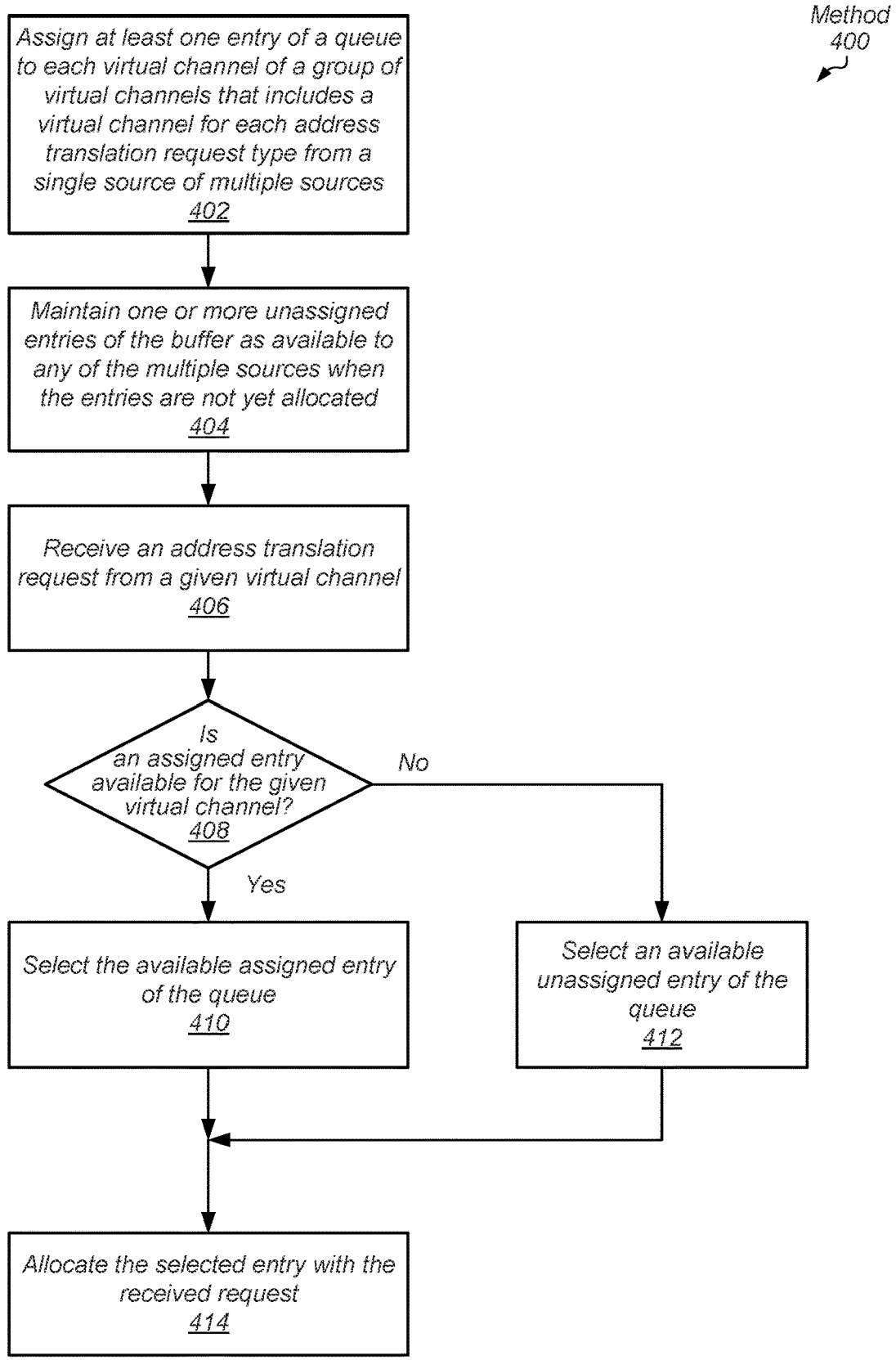
FIG. 4 is a generalized diagram of one embodiment of a method for efficiently allocating entries of a queue that stores at least address translation requests.

Referring now to FIG. 4, one embodiment of a method 400 for efficiently allocating entries of a queue that stores at least address translation requests is shown. For purposes of discussion, the steps in this embodiment (as well as in FIG. 5) are shown in sequential order. However, in other embodiments some steps occur in a different order than shown, some steps are performed concurrently, some steps are combined with other steps, and some steps are absent.

When a particular application begins, one or more of the operating system and the application perform dynamic reconfiguration of virtual channel assignments and set up permission for particular sources to access particular page tables. One or more of the sources with permission are endpoints such as a peripheral device. The sources that are granted permission are capable of generating access requests for copies of address translations in the particular page tables. The circuitry of a queue assigns at least one entry of the queue to each virtual channel of a group of virtual channels that includes a virtual channel for each address translation request type from a single source of multiple sources (block 402). Here, a virtual channel is assigned to an address translation request from a particular source. In one example, virtual channel (VC) 1 is assigned to address translation requests from a first type of peripheral device, VC 2 is assigned to address translation requests from a second type of peripheral device, VC 3 is assigned to address translation requests from a memory controller, and so forth. Although virtual channel identifiers 1-3 are used here, in other embodiments, other identifiers are used. Therefore, the control circuitry of the queue assigns at least one entry to each virtual channel of a group of virtual channels where the group includes a virtual channel for each address translation request type from a single source of the multiple sources.

The circuitry maintains one or more unassigned entries of the buffer as available to any of the multiple sources when the entries are not yet allocated (block 404). The circuitry receives an address translation request from a given virtual channel (block 406). One example of the address translation request is a read request requesting to retrieve a copy of one or more virtual-to-physical address translations from the destination. Another example of the address translation request is an invalidation request requesting to invalidate one or more stored virtual-to-physical address translations stored at the destination. If the circuitry determines an assigned entry is available for the given virtual channel ("yes" branch of the conditional block 408), then the circuitry selects the available assigned entry of the queue (block 410). Following, the circuitry allocates the selected entry with the received request (block 414). Since the control circuitry of the queue assigned at least one entry to each virtual channel of the group of virtual channels that includes a virtual channel for each address translation request type from a single source of multiple sources, the assigned entry is only unavailable when the assigned entry is already allocated. The arbitration circuitry of the queue inspects the assigned entries of the queue. Consequently, no virtual channel with access to the shared address translations has a request that will be blocked from arbitration due to no available assigned entries.

If the circuitry determines an assigned entry is unavailable for the given virtual channel ("no" branch of the conditional block 408), then the circuitry selects an available unassigned entry of the queue (block 412). Following, the circuitry allocates the selected entry with the received request (block 414). In various embodiments, the queue has available unassigned entries, because the queue sends an indication to other sources or queues when the unassigned entries are unavailable. In some embodiments, the queue and the other sources and queues maintain a number of credits that indicate how many requests the circuitry is able to receive and how many requests for each of the other sources and queues are able to be sent in a particular clock cycle.

Figure 5:
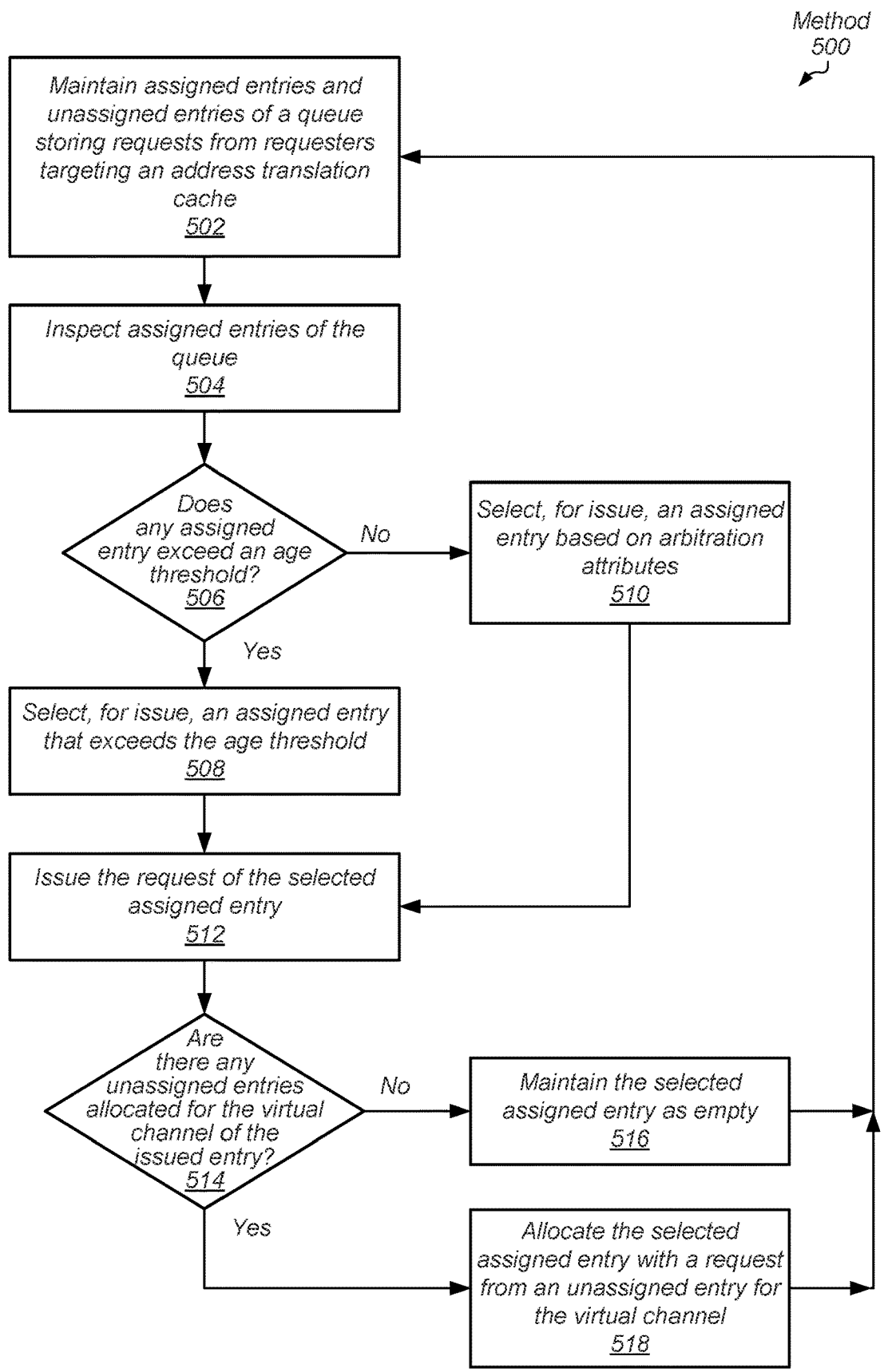
FIG. 5 is a generalized diagram of one embodiment of a method for efficiently issuing from entries of a queue that stores at least address translation requests.

Referring now to FIG. 5, one embodiment of a method 500 for efficiently issuing from entries of a queue requests that stores at least address translation requests is shown. The circuitry of the queue maintains assigned entries and unassigned entries of a queue storing requests from requesters targeting an address translation cache (block 502). The circuitry inspects assigned entries of the queue (block 504). If the circuitry determines no assigned entry exceeds an age threshold ("no" branch of the conditional block 506), then the circuitry selects, for issue, an assigned entry based on arbitration attributes (block 510). Examples of these attributes are a received priority level of the request, a quality-of-service (QoS) parameter, a source identifier (ID), an application ID or type, such as a real-time application, a virtual channel ID, a bandwidth requirement or a latency tolerance requirement, an indication of age, and so forth.

In various embodiments, the control circuitry of the queue assigns at least one entry to each virtual channel of a group of virtual channels where the group includes a virtual channel for each address translation request type from a single source of the multiple sources. In some embodiments, during each arbitration stage, when the arbitration circuitry of the queue selects two or more requests to issue from assigned entries of the queue, the arbitration circuitry selects at least one request from the assigned entries of the above group of virtual channels. An arbitration stage takes one or more clock cycles depending on the implementation. Therefore, the arbitration circuitry selects for issue at least one address translation request from the above group of virtual channels during each arbitration stage although the selected address translation request has a lower arbitration value than one or more requests of other virtual channels.

If the circuitry determines an assigned entry exceeds an age threshold ("yes" branch of the conditional block 506), then the circuitry selects, for issue, an assigned entry that exceeds the age threshold (block 508). If two or more requests stored in the assigned entries have an age that exceed the age threshold and the arbitration circuitry can't issue all of them, then circuitry selects one or more of the requests based on attributes as described earlier. The circuitry issues the request of the selected assigned entry (block 512). For example, the circuitry issues the selected request to the endpoint that includes shared address translation cache, and one or more intermediate queues may be on the path toward the endpoint.

If the circuitry determines that there are no unassigned entries allocated for the virtual channel of the issued entry ("no" branch of the conditional block 514), then the circuitry maintains the selected assigned entry as empty (block 516). For example, the circuitry does not allocate the selected assigned entry for other virtual channels even if the selected assigned entry is the only available entry of the queue. If the circuitry determines that there is an unassigned entry allocated for the virtual channel of the issued entry ("yes" branch of the conditional block 514), then the circuitry allocates the selected assigned entry with a request from an unassigned entry for the virtual channel (block 518). Following, control flow of method 500 returns to block 502 where the circuitry maintains the assigned entries and unassigned entries of the queue.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
 a queue comprising a plurality of entries, the plurality of entries including at least a first entry configured to store a request corresponding to a first group of virtual channels and at least a second entry configured to store a request corresponding to a second group of virtual channels different from the first group of virtual channels, wherein:
  each virtual channel of the second group of virtual channels is assigned for conveyance of address translation requests from different requesters of a plurality of requesters; and
  the virtual channels represent a plurality of time division multiplexed channels on a single physical channel; and
 circuitry configured to:
  assign given entries of the plurality of entries to each virtual channel of the second group of virtual channels; and select one or more requests to issue from the plurality of entries utilizing at least selection criteria of each of the given entries that is allocated.

2. The apparatus as recited in claim 1, wherein the circuitry is further configured to select at least one request from the given entries that are allocated each time requests are issued from the plurality of entries.

3. The apparatus as recited in claim 1, wherein a type of an address translation request is an access request that targets a copy of at least a portion of a shared page table storing address translations.

4. The apparatus as recited in claim 3, wherein a requester assigned a virtual channel of the second group of virtual channels is one of a plurality of clients and peripheral devices with permission to access the shared page table.

5. The apparatus as recited in claim 3, wherein, based at least in part on an address space that comprises addresses of the address translations being redefined, the circuitry is further configured to:
  redefine the second group of virtual channels; and
  reassign at least one of the plurality of entries to each virtual channel of the second group.

6. The apparatus as recited in claim 1, wherein a type of an address translation request is an invalidation request that targets a copy of at least a portion of a shared page table storing address translations.

7. The apparatus as recited in claim 1, wherein the circuitry is further configured to maintain an entry of the given entries as deallocated, in response to:
  the entry of the given entries being deallocated; and
  there being no pending requests of a virtual channel of the second group assigned to the entry of the given entries.

8. The apparatus as recited in claim 1, wherein the circuitry is further configured to:
  receive an allocation request that indicates a first request of a first type that is different from the address translation requests from different requesters is ready to be allocated in the plurality of entries; and
  send a response indicating a wait to allocate the first request based at least in part on:
    no entry of the plurality of entries assigned to requests of the first type being available for allocation; and
    no unassigned entries of the plurality of entries being available for allocation.

9. A method comprising:
  storing, in at least a first entry of a plurality of entries of a queue, a request corresponding to a first group of virtual channels and, in at least a second entry of the plurality of entries, a request corresponding to a second group of virtual channels different from the first group of virtual channels, wherein:
    each virtual channel of the second group of virtual channels is assigned for conveyance of address translation requests from different requesters of a plurality of requesters; and
    the virtual channels represent a plurality of time division multiplexed channels on a single physical channel;
  assigning, by circuitry of the queue, given entries of the plurality of entries to each virtual channel of the second group of virtual channels; and
  selecting, by the circuitry of the queue, one or more requests to issue from the plurality of entries utilizing at least selection criteria of each of the given entries that is allocated.

10. The method as recited in claim 9, further comprising selecting at least one request from the given entries that are allocated each time requests are issued from the plurality of entries.

11. The method as recited in claim 9, wherein a type of an address translation request is an access request that targets a copy of at least a portion of a shared page table storing address translations.

12. The method as recited in claim 11, wherein a requester assigned a virtual channel of the second group of virtual channels is one of a plurality of clients and peripheral devices with permission to access the shared page table.

13. The method as recited in claim 11, wherein, based at least in part on an address space that comprises addresses of the address translations being redefined, the method further comprises:
  redefining the second group of virtual channels; and
  reassigning at least one of the plurality of entries to each virtual channel of the second group.

14. The method as recited in claim 9, further comprising maintaining an entry of the given entries as deallocated, in response to:
  the entry of the given entries being deallocated; and
  there being no pending requests of a virtual channel of the second group assigned to the entry of the given entries.

15. A computing system comprising:
  a plurality of requesters configured to generate requests; and
  a first queue, wherein the first queue comprises:
    a first plurality of entries including at least a first entry configured to store a request corresponding to a first group of virtual channels and at least a second entry configured to store a request corresponding to a second group of virtual channels different from the first group of virtual channels, wherein:
      each virtual channel of the second group of virtual channels is assigned for conveyance of address translation requests from different requesters of a plurality of requesters; and
      the virtual channels represent a plurality of time division multiplexed channels on a single physical channel; and
    first circuitry; and
  wherein the first circuitry is configured to:
    assign given entries of the first plurality of entries to each virtual channel of the second group of virtual channels; and
    select one or more requests to issue from the first plurality of entries utilizing at least selection criteria of each of the given entries that is allocated.

16. The computing system as recited in claim 15, wherein the first circuitry is further configured to select at least one request from the given entries that are allocated each time requests are issued from the first plurality of entries.

17. The computing system as recited in claim 15, wherein a type of an address translation request is an access request that targets a copy of at least a portion of a shared page table storing address translations.

18. The computing system as recited in claim 17, wherein, based at least in part on an address space that comprises addresses of the address translations being redefined, the circuitry is further configured to:
  redefine the second group of virtual channels; and
  reassign at least one of the first plurality of entries to each virtual channel of the second group.

19. The computing system as recited in claim 15, wherein the first circuitry is further configured to maintain an entry of the given entries as deallocated, in response to:
   the entry of the given entries being deallocated; and
   there being no pending requests of a virtual channel of the second group assigned to the entry of the given entries.

20. The computing system as recited in claim 15, wherein the computing system further comprises a second queue, the second queue comprising:
   a second plurality of entries, each entry configured to store a response to one of a third group of virtual channels and a fourth group of virtual channels, wherein each virtual channel of the fourth group is assigned to a response of an address translation type for a single requester of a plurality of requesters; and
   second circuitry; and
   wherein the second circuitry is configured to:
      assign a set of entries of the second plurality of entries to each virtual channel of the fourth group; and
      utilize, during each arbitration stage, selection criteria from the set of entries that are allocated.

* * * * *